United States Patent [19]
Tamura

[11] Patent Number: 6,101,359
[45] Date of Patent: Aug. 8, 2000

[54] IMAGE FORMING APPARATUS

[75] Inventor: Satoshi Tamura, Mishima, Japan

[73] Assignee: Canon Kabushiki Kaisha, Tokyo, Japan

[21] Appl. No.: 09/196,639

[22] Filed: Nov. 19, 1998

[30] Foreign Application Priority Data

Nov. 21, 1997 [JP] Japan .................................. 9-337685

[51] Int. Cl.⁷ .................................................. G03G 15/01
[52] U.S. Cl. ........................................ 399/301; 347/116
[58] Field of Search .............................. 347/116; 399/301

[56] References Cited

U.S. PATENT DOCUMENTS 4,912,491   3/1990   Hoshino et al. .......................... 347/116
5,631,686   5/1997   Castelli et al. ........................... 347/116

FOREIGN PATENT DOCUMENTS 8-69146   3/1996   Japan .

*Primary Examiner*—Arthur T. Grimley
*Assistant Examiner*—William A. Noë
*Attorney, Agent, or Firm*—Fitzpatrick, Cella, Harper & Scinto

[57] ABSTRACT

The present invention provides an image forming apparatus including a first image forming unit for forming an image on a recording material at a first image forming position, a second image forming unit for forming an image on the recording material at a second image forming position different from the first image forming position, a light permeable recording material bearing member for bearing the recording material and for conveying the recording material to the first and second positions, a position detecting unit for detecting a position of a test pattern formed on the recording material bearing member by the first and second image forming unit, and a light reflecting member adapted to reflect light passed through the recording material bearing member onto the position detecting unit and shiftable to a position where the light is not reflected onto the position detecting unit.

5 Claims, 8 Drawing Sheets

IMAGE FORMING APPARATUS

BACKGROUND OF THE INVENTION

1. Field of the Invention

The present invention relates to an image forming apparatus such as a copying machine, a printer and the like, and more particularly, it relates to an image forming apparatus capable of forming a color image.

2. Related Background Art

Recently, color image forming apparatuses have remarkably been developed and progressed, and there are many kinds of image forming apparatuses such as ink jet type, heat-transfer type, silver salt electrophotographic type and electrophotographic type. Among them, electrophotographic image forming apparatuses have been most popularized due to its high speed ability and high image quality.

FIG. 7 is a sectional view showing an example of a conventional color image forming apparatus of four drum type. Now, a construction and operation of such an apparatus will be described.

A color original 1 rested on an original support is illuminated by an illumination lamp 2, and a color decomposed image is read by a CCD color line sensor 3. The read image is sent, through a color signal process circuit 4 and a cable 25, to an image process circuit 5, where digital image process is performed. Thereafter, full color image signals for one page is temporarily stored in a memory device 26.

The reason is that a plurality of image forming portions (image forming stations) are provided side by side and at least image data corresponding to a distance between the adjacent image forming portions must be stored in order to form plural color images simultaneously.

The image forming portions (drum stations) are prepared for respective colors, i.e., magenta (M), cyan (C), yellow (Y) and black (K). The respective image forming portions include photosensitive drums 29, 30, 31 and 32, primary chargers 41, 42, 43 and 44, developing devices 33, 34, 35 and 36, transfer chargers 37, 38, 39 and 40, and a cleaning devices 62, 63, 64 and 65.

As a recording material (copy sheet) supplied from a cassette 61 is advance, a tip end of the recording material is detected by a tip end detector (ITOP sensor) 67 disposed at an upstream end of a transfer belt 70 (formed by connecting a PET resin film in an endless form, in this example). As a result, in synchronous with a sheet tip end signal, the image signal for color component already stored in the memory device 26 is read at a proper timing by a timing control circuit (not shown), and the read signal is processed in a second digital image signal processing portion 27. Thereafter, a light beam corresponding to a first color (magenta component) modulated by a semi-conductor laser 57 is reflected by a polygon mirror 28 and reflection mirrors 45, 46, 47 to be illuminated onto the photosensitive drum 29 of the first station, thereby forming a first color latent image.

This latent image is developed by the developing device 33 with magenta color toner to form a magenta toner image. The magenta toner image is transferred, by the transfer charger 37, onto the recording material borne on the transfer belt 70 and conveyed to a transfer portion.

Similarly, in the second, third and fourth stations, cyan, yellow and black toner images are formed, respectively, and these color toner images are transferred onto the same single recording material in a superimposed fashion at respective transfer portions. In FIG. 7, the reference numerals 48 to 50 denote reflection mirrors in the second station, 58 denotes a semi-conductor laser, 51 to 53 denote reflection mirrors in the third station, 59 denotes a semi-conductor laser, 54 to 56 denote reflection mirrors in the fourth station, 60 denotes a semi-conductor laser.

The recording material (sheet) to which the four color toner images were transferred is sent, by a convey belt 14, to fixing rollers 15, 16, where color toners are mixed and fixed onto the sheet to provide a full-color copy. In FIG. 7, the reference numeral 66 denotes an interface circuit.

In such an image forming apparatus, as mentioned above, four drum station-for forming the respective color component images, four laser beam generators (semi-conductor lasers) for forming the latent images and four optical systems including the reflection mirrors for illuminating the laser beams onto the respective photosensitive drums with high accuracy are required.

On the other hand, in an accurate full color copying apparatus, it is required that positional accuracy for overlapping the color component images together is 100 to 150 $\mu$m or less both in a main scanning direction and a sub scanning direction. However, it is very difficult to mechanically adjust various elements for forming the images with such accuracy. If such adjustment could be achieved, for example, the adjusted positions are apt to be deviated due to positional deviation caused by thermal expansion of various elements generated by change in temperature, and/or positional deviation caused by mechanical positional accuracy after sheet jam treatment and/or exchange of parts for exchanging damaged or worn photosensitive drum or developing device.

In order to permit automatic adjustment of the positional accuracy for overlapping the color component images, there has been proposed the following technique. That is to say, registration patterns (for example marks "#") for magenta, cyan, yellow and black toners are formed on the respective photosensitive drums 29 to 32. As shown in FIG. 8, the patterns are transferred onto the transfer belt 70 so that the color component patterns 72 are formed on the transfer belt 70 in two rows (rear side and front side) at predetermined interval time. And, at the rear side and front side, the light beams are illuminated onto the patterns, and reflected light beams are read by optical sensors 80, 81 (each comprised of CCD). In this way, deviation amounts and inclination amounts of respective image forming stations in the main scanning direction and the sub scanning direction are detected, and the deviation amounts in the sub scanning direction and the main scanning direction are automatically corrected.

The principle for automatic adjustment of registration in the automatic correcting technique is as follows. As mentioned above, since the transfer belt 70 on which the respective color patterns are formed is normally made of PET resin, as shown in FIG. 9B, in a wavelength area of 400 to 700 nm, light permeability is high (90% or more) and, thus, there is no reflection intensity (i.e., cannot be detected hardly). On the other hand, in a near-infrared area over 700 nm, there is reflection intensity. Carbon black as resistance reducing agent may be added to resin to reduce resistance of base resin of the transfer belt. However, also in such a case, in the wavelength area of 400 to 700 nm, there is no reflection intensity.

On the other hand, regarding the toner from which the patterns 72 are formed, as shown in FIG. 9A, for wavelengths between 400 and 700 nm, yellow toner, magenta toner and cyan toner have high light reflection (i.e., these wavelengths have great reflection intensities. Since the black toner is normally uses carbon black as coloring agent, the black toner does almost not have reflection intensity in the wavelength area of 400 to 700 nm.

As mentioned above, the transfer belt 70 can reflect only light of infrared area including near-infrared ray. Accordingly, by arranging infrared ray cut filters (not shown) below light receiving portions of the sensors 80, 81, above mentioned magenta, cyan and yellow patterns can be read. However, since the black pattern have no reflectable wavelength in the entire area, the black pattern cannot be distinguished from the transfer belt.

In order to detect the black patterns, in the yellow station (third station) immediately before the black station, the solid yellow toner is transferred onto the transfer belt. And, black toner registration correcting (registering) patterns are transferred onto an yellow area defined by the solid yellow toner in an overlapping manner, and the black patterns are detected by the sensors 80, 81 as negative images in the yellow background.

FIGS. 10A and 10B are timing charts showing timings for forming the registration patterns in such an image forming apparatus, and, in particular, FIG. 10A corresponds to registration mark forming timings in the sub scanning direction and FIG. 10B corresponds to registration mark forming timings in the main scanning direction.

The automatic correction in the sub scanning direction is effected as follows. As shown in FIG. 10A, in the sub scanning direction, the number of lines is counted by a counter circuit (not shown) in accordance with time elapsed from rise-up of an output signal ITOP (signal detecting a tip end of the copy sheet) from an ITOP sensor 67. Then, for example, in magenta, after tm time is counted, in cyan, after tc time is counted, in yellow, after ty time is counted, and, in black, after tk time is counted, output signals MTOP, CTOP, YTOP and KTOP are generated, respectively. Image signals are sent in accordance with rise-up times of the signals, and the registration color patterns 72 are formed on the transfer belt 70. Then, as mentioned above, the patterns are detected by the sensors 80, 81, and the count values tm to tk are determined on the basis of the detection timings.

The automatic correction in the main scanning direction is effected as follows. Signals MBD, CBD, YBD, KBD shown in FIG. 10B are detection signals of laser beams for forming latent images for magenta, cyan, yellow and black, which signals are reference signals for determining main scanning positions of the images. The positions of the color images are determined by enable signals MEN, CEN, YEN and KEN generated after pixel count values xm, xc, xy and xk from the laser beam detection signals MBD, CBD, YBD, KBD. Accordingly, also in this case, as mentioned above, on the basis of the timing positions detected by the sensors 80, 81, the respective pixel count values xm, xc, xy and xk may be determined properly.

Incidentally, the automatic correction for inclination can be effected by inclining the reflection mirrors 45, 46, 47 by an actuator (not shown) regarding magenta, for example.

However, in the above-mentioned conventional example, for example, the yellow solid image having optical property different from that of the black toner is transferred onto the transfer belt 70 and the black pattern is transferred onto the yellow solid image. Thus, the background yellow toner and the overlaying black toner cannot be removed completely by a cleaner (not shown), with the result that the black toner and the yellow toner remain on the transfer belt 70, thereby contaminating a rear surface of a next copy sheet.

SUMMARY OF THE INVENTION

The present invention aims to eliminate the above-mentioned conventional drawback, and an object of the present invention is to provide an image forming apparatus which includes a means for detecting positions of test patterns having low reflection factor correctly.

Another object of the present invention is to provide an image forming apparatus which can restrain color deviation.

The other object of the present invention is to provide an image forming apparatus comprising a first image forming means for forming an image on a recording material at a first image forming position, a second image forming means for forming an image on the recording material at a second image forming position different from the first image forming position, a light permeable recording material bearing member for bearing the recording material and for conveying the recording material to the first and second positions, a position detecting means for detecting a position of a test pattern formed on the recording material bearing member by the first and second image forming means, and a light reflecting member adapted to reflect light passed through the recording material bearing member onto the position detecting means and shiftable to a position where the light is not reflected onto the position detecting means.

The other objects and features of the present invention will be apparent from the following detailed explanation referring to the accompanying drawings.

DETAILED DESCRIPTION OF THE PREFERRED EMBODIMENTS

An image forming apparatus according to the present invention will now be fully explained with reference to the accompanying drawings.

First Embodiment

Figure 1:
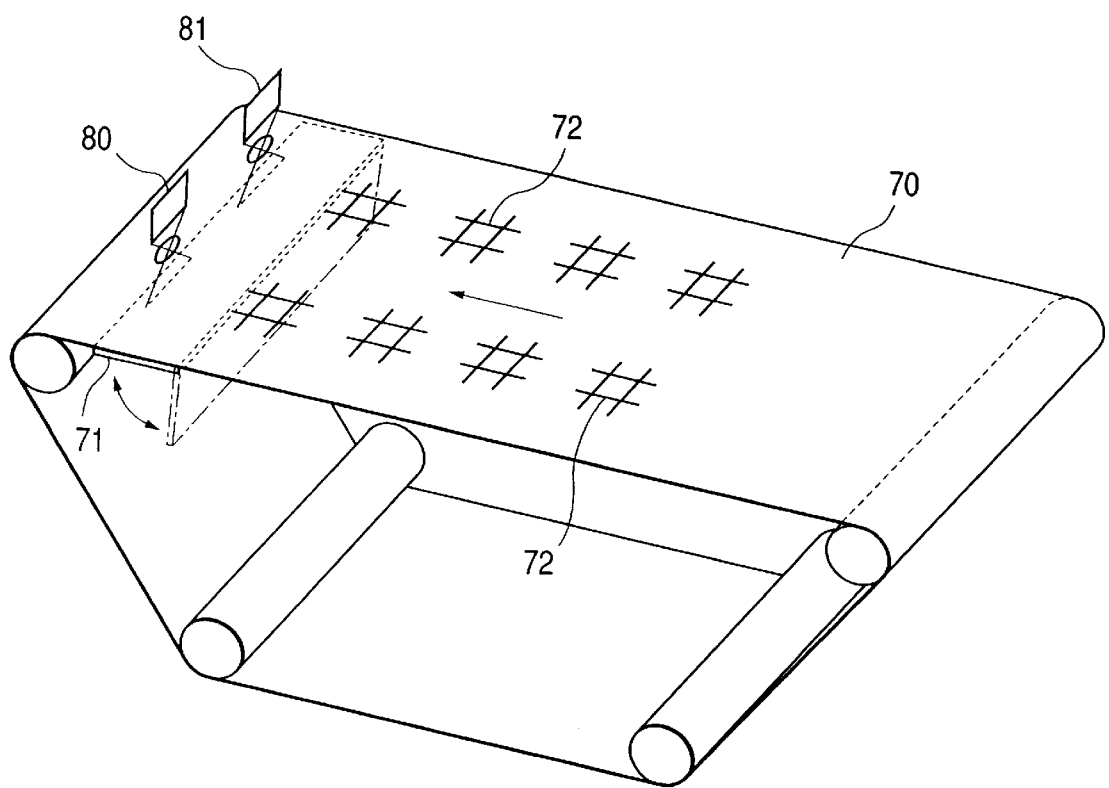
FIG. 1 is a perspective view showing a transfer belt and sensors in an embodiment of an image forming apparatus according to the present invention.

FIG. 1 is a perspective view showing a transfer belt and sensors in an embodiment of an image forming apparatus according to the present invention.

Figure 7:
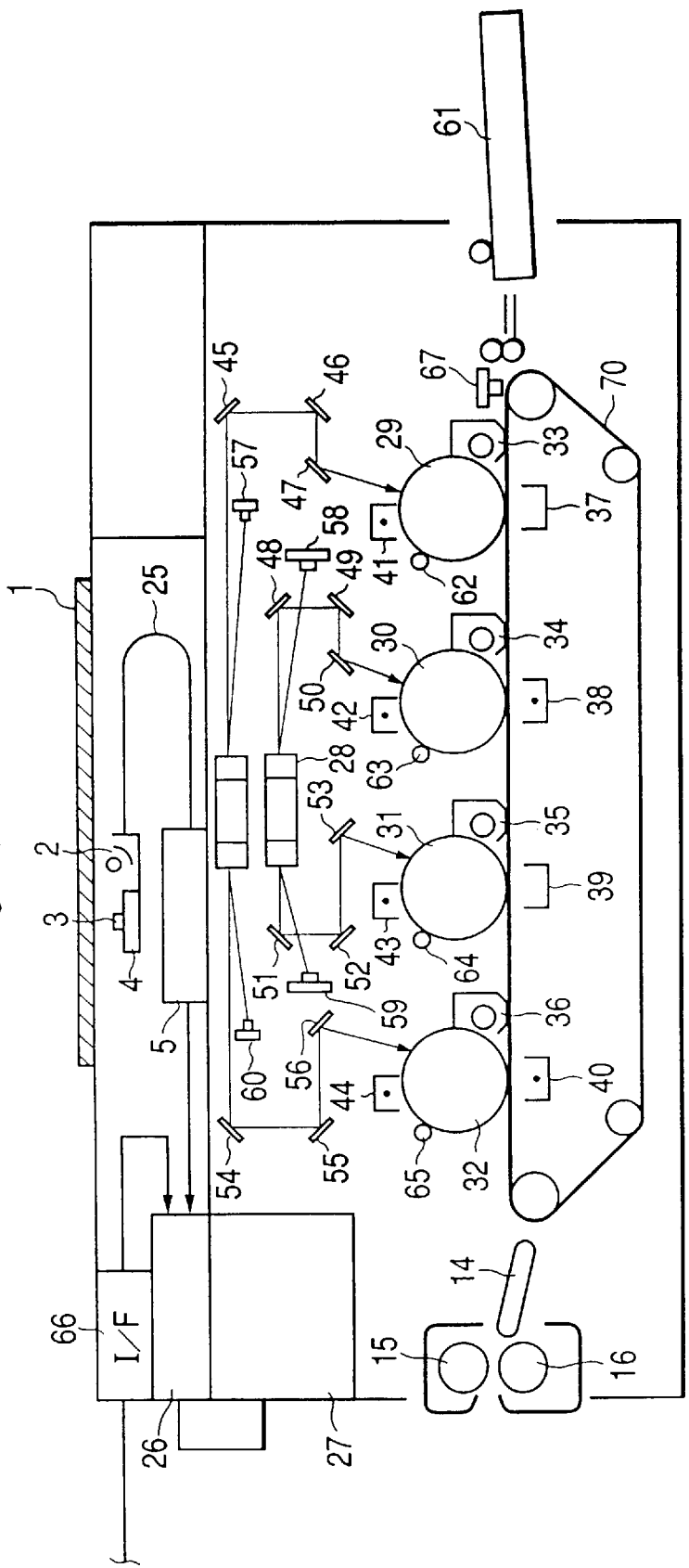
FIG. 7 is a sectional view of a conventional image forming apparatus.
Figure 8:
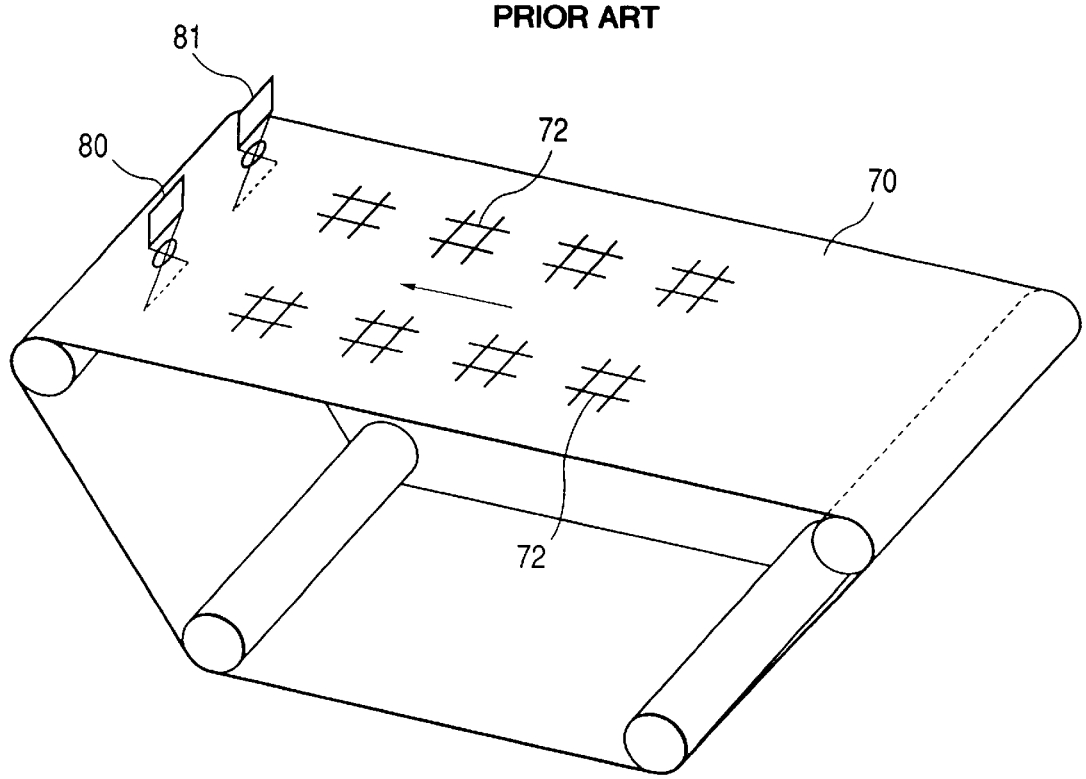
FIG. 8 is a perspective view showing a transfer belt and sensors in the image forming apparatus of FIG. 7.

The present invention has a characteristic that a reflection plate 71 is disposed in association with a transfer belt 70. Since an image forming apparatus itself is substantially the same as the conventional image forming apparatus already explained in connection with FIG. 7, illustration and explanation thereof will be omitted.

As shown in FIG. 1, the reflection plate 71 is disposed along a width-wise direction of the transfer belt 70 at a rear side of the transfer belt 70 opposite to a front side onto which light beams emitted from light emitting elements (not shown) of an optical sensor unit, i.e., a front surface opposed to sensors (light receiving elements) 80, 81. The reflection plate 71 can be rocked in directions shown by the arrow around a shaft parallel to generatrix of the transfer belt 70 by means of a rocking mechanism (not shown) to be shifted toward and away from the rear surface of the transfer belt 70.

Incidentally, the reflection plate 71 may be disposed horizontally and may be shifted toward and away from the rear surface opposed to the sensors by shifting or rocking the plate in a horizontal direction.

Figure 2A:
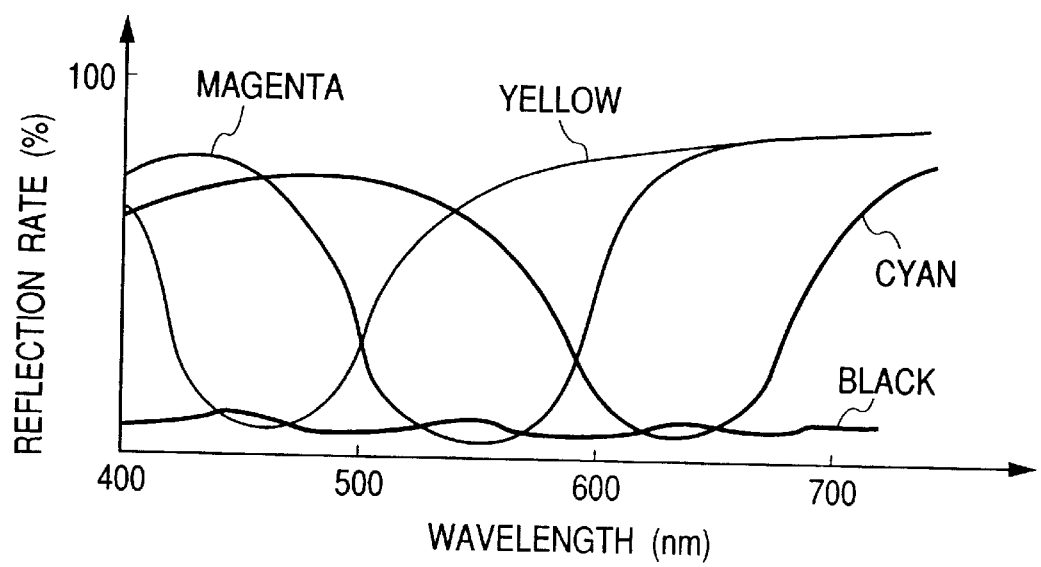
FIGS. 2A and 2B are graphs showing spectroscopic reflection features of a reflection plate disposed in connection with the transfer belt of FIG. 1, the transfer belt and color toners.
Figure 2B:
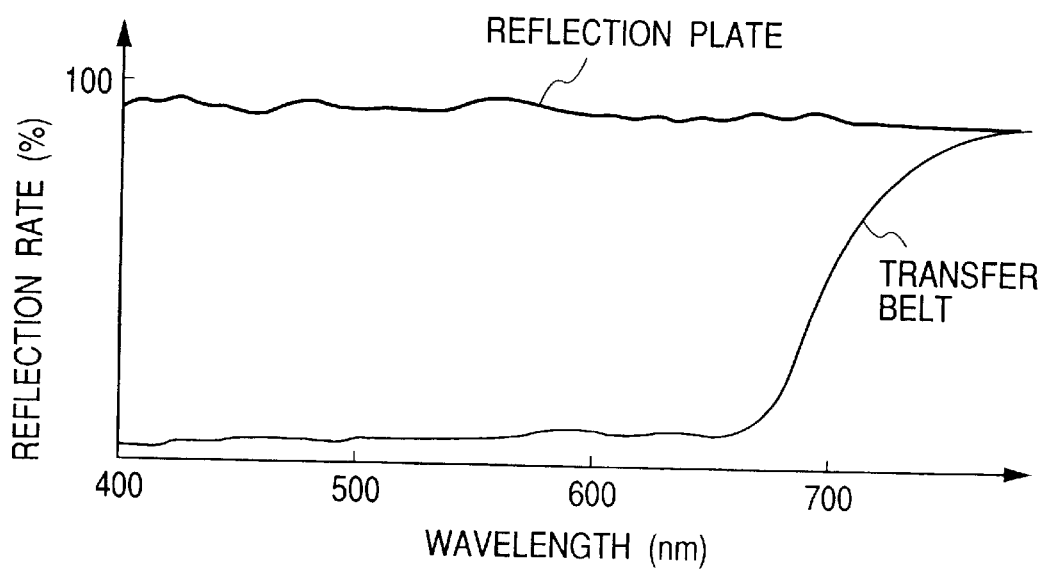

As shown in FIG. 2B, the reflection plate 71 has light reflection rate (factor) of about 90% in a wavelength area of 400 to 700 nm.

Figure 9A:
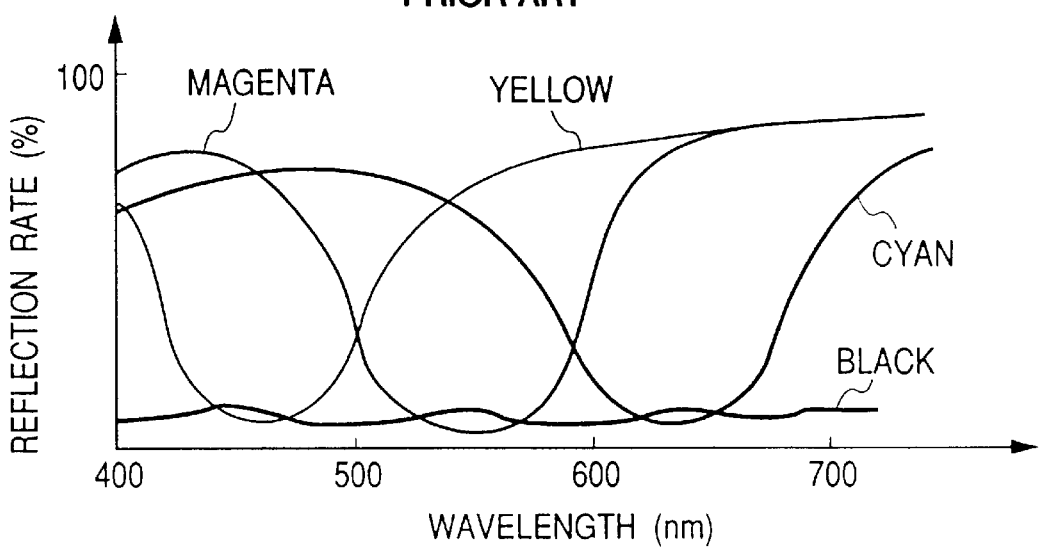
FIGS. 9A and 9B are graphs showing spectroscopic reflection features of color toners and a spectroscopic reflection feature of a transfer belt in the image forming apparatus of FIG. 7.
Figure 9B:
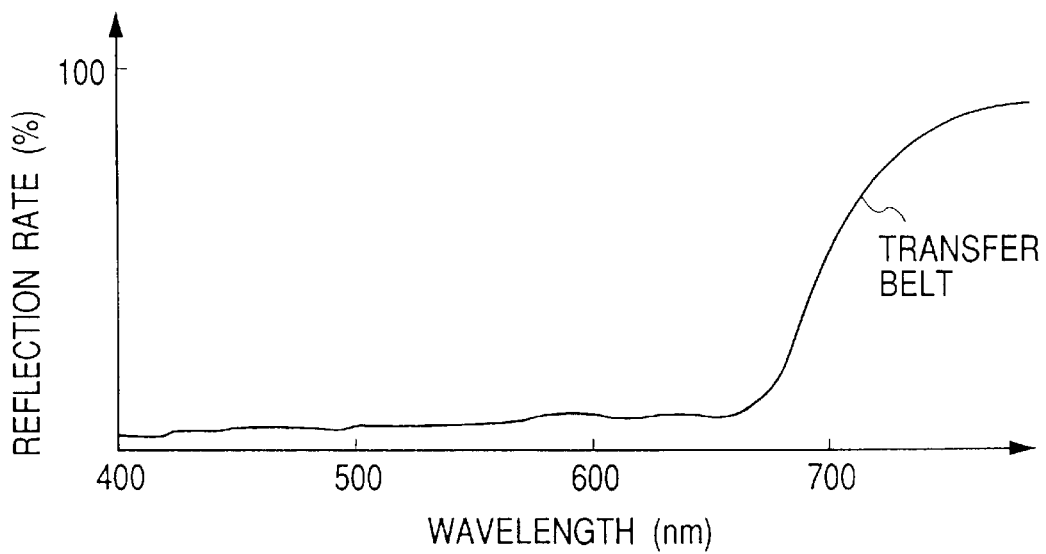
Figure 10A:
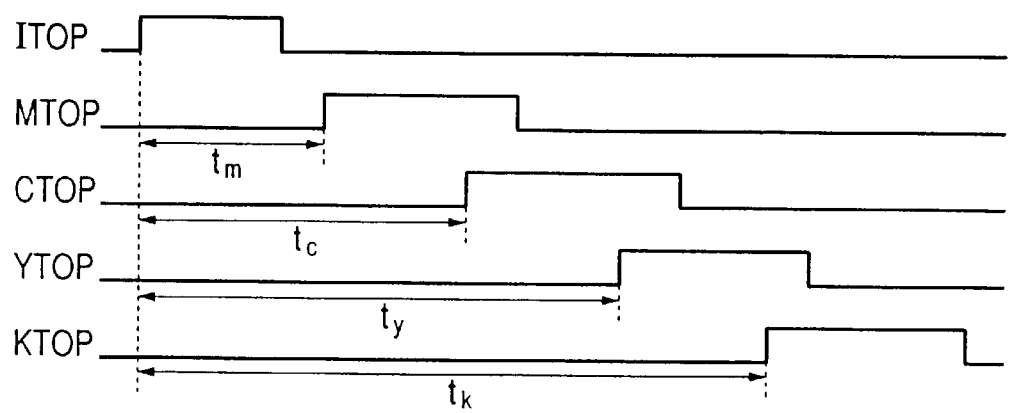
FIGS. 10A and 10B are timing charts showing timings for forming registration patterns in the image forming apparatus of FIG. 7.
Figure 10B:
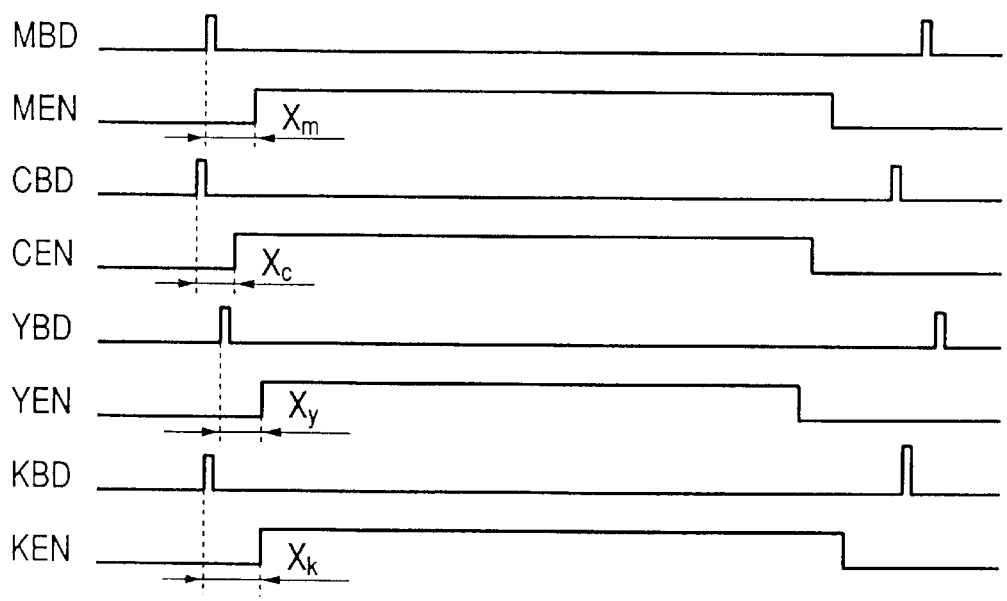

The transfer belt 70 is formed from polyethylene terephthalate (PET) resin film, and, as shown in FIG. 9B, average light reflection factor of the transfer belt 70 is 10% or less (light transparent (transmission) rate of 90% or more) in the wavelength area of 400 to 700 nm. The light reflection factor of the transfer belt 70 is also shown in FIG. 2B.

As shown in FIG. 9A, regarding spectroscopic reflection features of color toners, yellow toner, magenta toner and cyan toner have zones having high light reflection factor in the wavelength area of 400 to 700 nm, but, black toner have substantially no light reflection factor (substantially zero) in the wavelength area of 400 to 700 nm. The spectroscopic reflection features of color toners are also shown in FIG. 2A.

The feature for detecting patterns in the illustrated embodiment is that, when registration patterns 72 formed on the transfer belt 70 are read and detected by the sensors 80, 81, if the patterns 72 are black, the reflection plate 71 is shifted to a position of the rear surface of the transfer belt 70 opposed to the sensors 80, 81, and, if the patterns are other colors (magenta, cyan or yellow), the reflection plate 71 is retracted from the position of the rear surface of the transfer belt 70 opposed to the sensors 80, 81.

According to such a method, when the black patterns are detected, as can be seen from FIGS. 2A and 2B, in the wavelength area of 400 to 700 nm, since the reflection plate 71 has uniform high reflection feature and the black pattern has substantially no reflection feature, it is possible to recognize and detect the black patterns as portions having no light reflection in the light reflection area of the reflection plate 71.

The other color (magenta, cyan and yellow) patterns can be detected by directly reading wavelength areas having inherent high reflection factor of reflection light from the patterns.

As more preferable method, as disclosed in Japanese Patent Application Laid-open No. 8-69146 (1996), in order to improve pattern reading accuracy, reflection densities of patterns may be measured on the basis of light reflected from the color patterns transferred to a recording material bearing member and positions of the patterns may be calculated from histogram thereof.

In the illustrated embodiment, as mentioned above, even the black toner patterns having low reflection factor can be directly formed and position-detected without forming any background solid image on the transfer belt 70 and can be used for registration. Accordingly, there is no problem that the background image cannot be removed by the cleaner, and, thus, a rear surface of the recording material is not contaminated by the residual background image.

Second Embodiment

Figure 3:
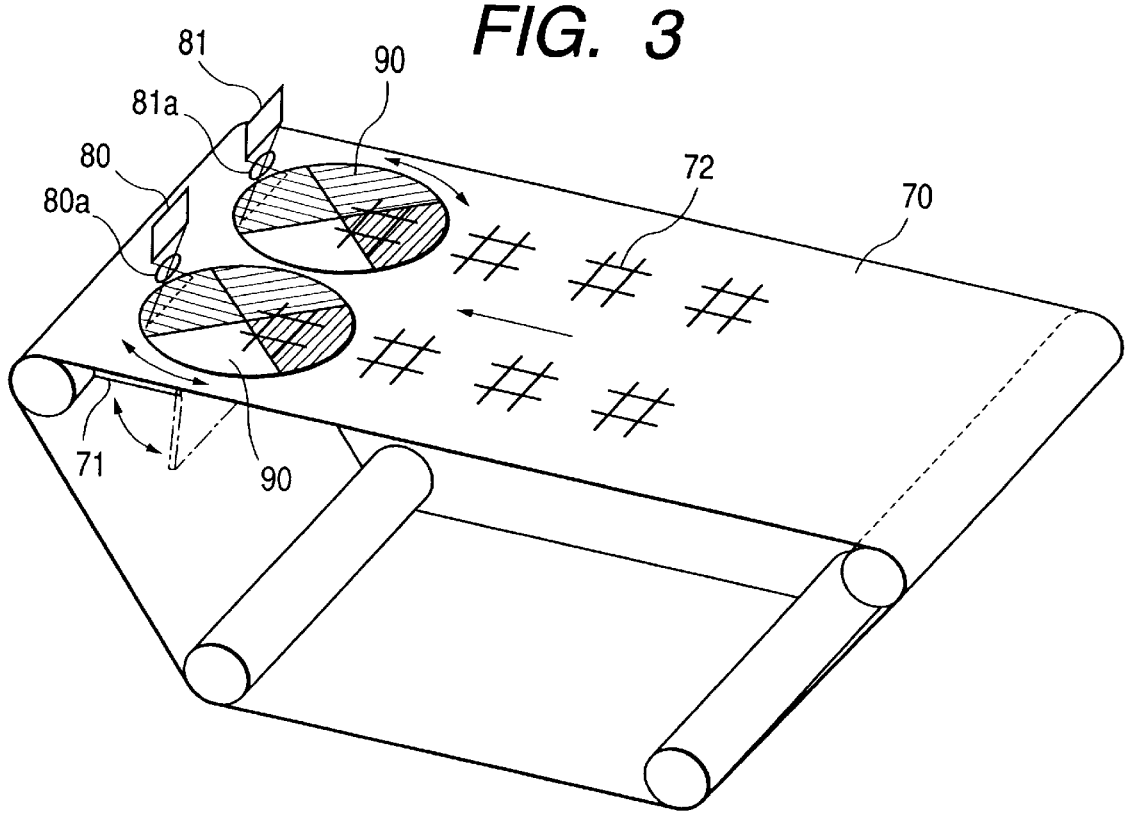
FIG. 3 is a perspective view showing a transfer belt and sensors according to another embodiment of the present invention.

In a second embodiment of the present invention, as shown in FIG. 3, cut filters 90 coping with yellow, magenta, cyan and black are disposed below light receiving portions 80a, 81a of the optical sensors 80, 81 above the transfer belt 70.

Figure 4:
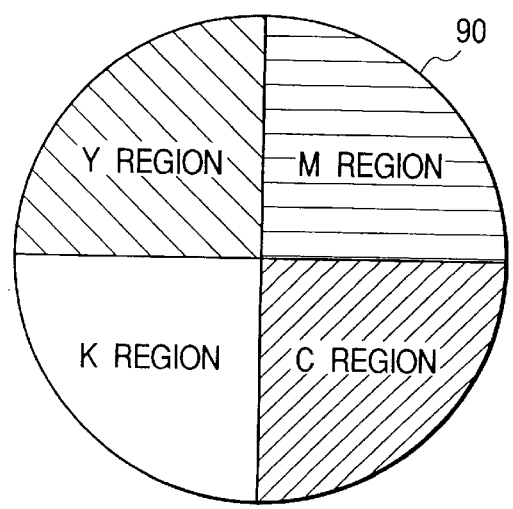
FIG. 4 is a plan view of a cut filter provided on each sensor of FIG. 3.

As shown in FIG. 4, each cut filter 90 is constituted by an optical plate including a K area having black property, an M area having magenta property, a C area having cyan property and a Y area having yellow property divided into four along a circumferential direction.

As shown in FIG. 3, the cut filters 90 are disposed to positions deviated from centers of the light receiving portions 80a, 81a toward this side (an upstream side) in a shifting direction of the transfer belt 70 within light receivable ranges below the light receiving portions 80a, 81a and are rotatable in directions shown by the arrows.

Figure 5:
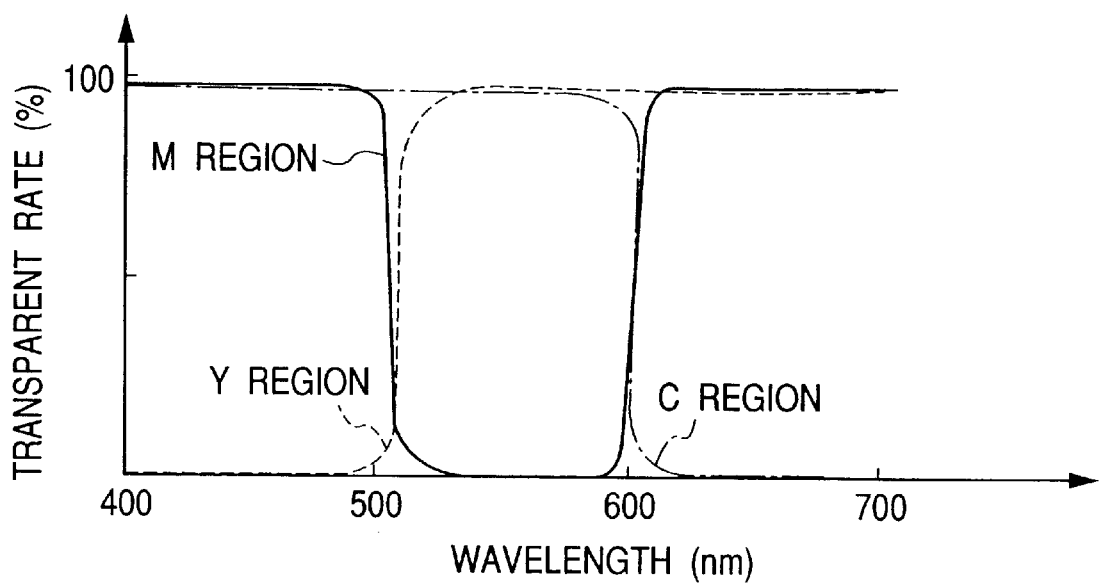
FIG. 5 is a graph showing spectroscopic permeable features of a magenta (M) area, cyan (C) area and yellow (Y) area of the cut filter of FIG. 4.

FIG. 5 shows spectroscopic features of the magenta (M) region (area), cyan (C) region and yellow (Y) region of the cut filter in the illustrated embodiment. The black (K) region of the filter 90 has no filtering function to permit transmission of light of 100%.

The feature of the illustrated embodiment is that, when the magenta, cyan, yellow and black registration patterns 72 are read by the sensors 80, 81, the cut filters 90 are rotated to position the regions M to K of the filters 90 corresponding to the color of the patterns in front of the light receiving portions 80a, 81a of the sensors 80, 81.

Figure 6:
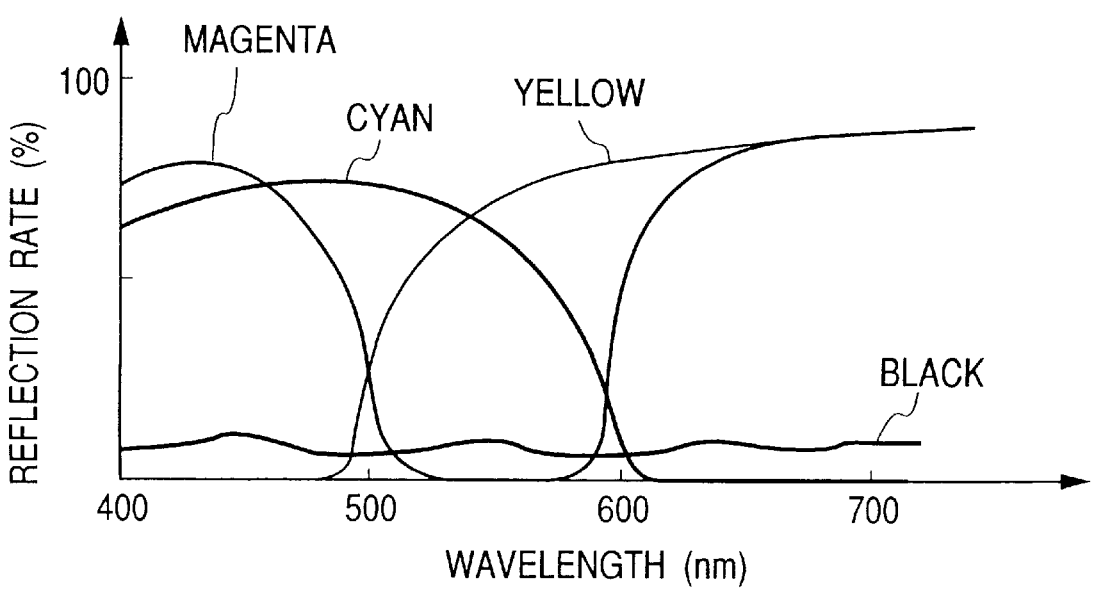
FIG. 6 is a graph showing spectroscopic reflection features of color toners after passed through the respective color areas of the cut filter of FIG. 4.

Spectroscopic reflection features of the toners passed through the regions M to K of the cut filters 90 corresponding to respective colors are as shown in FIG. 6. As can be seen from FIG. 6, different from the spectroscopic features obtained by not using the cut filters as shown in FIG. 2A, since weak noise components of read color signals are cut, a dynamics range for reading the registration patterns 72 is widened, thereby improving reading ability.

Accordingly, similar to the first embodiment, regarding the magenta, cyan and yellow toners, reflection light reflected from the registration patterns 72 formed on the transfer belt 70 is directly read by the sensors 80, 81, and, regarding the black toner, the patterns are read as portion having no reflection in the reflected area. In this case, in the illustrated embodiment, since the noise components of the patterns 72 are removed by the cut filters 90 corresponding to the respective colors, the reading ability is improved. Accordingly, more stable registration correction can be achieved. Of course, similar to the first embodiment, there is no problem that the background image cannot be removed by the cleaner, and, thus, a rear surface of the recording. material is not contaminated by the residual background image.

As mentioned above, in the present invention, when the positions of the color registration test patterns formed on the recording material bearing member are detected by the sensors, the reflection member for reflecting the light emitted from the sensors is provided so that, when the toner patterns having lowest reflection factor (among plural color toner) are detected, the reflection member is positioned below the rear surface of the recording material bearing member onto which the light is illuminated. Thus, even the toner patterns having lowest reflection factor can easily be position-detected without forming any background image on the recording material bearing member and can be used for correcting superimposed positions of the respective color images. Accordingly, there is no problem that the background image cannot be removed by the cleaner, and, thus, a rear surface of the recording material is not contaminated by the residual background image.

The present invention is not limited to the above-mentioned embodiment, but various alterations and modifications can be made within the scope of the invention.

What is claimed is:

1. An image forming apparatus comprising:
    a first image forming means for forming an image on a recording material at a first image forming position;
    a second image forming means for forming an image on a recording material at a second image forming position different from the first image forming position;
    a recording material bearing member which transmits light for bearing the recording material and for conveying the recording material to the first position and the second position;
    a position detecting means for detecting optically a position of test patterns formed on said recording material bearing member by said first image forming means and said second image forming means; and
    a light reflecting member positioned to reflect light transmitted through said recording material bearing member onto said position detecting means, said light reflecting member being shiftable to a position where light is not reflected onto said position detecting means.

2. An image forming apparatus according to claim 1, wherein said light reflecting member is shifted to a position where light is reflected to said position detecting means when a position of a test pattern having a low reflection rate is to be detected.

3. An image forming apparatus according to claim 1, wherein said first image forming means forms a color image on the recording material and said second image forming means forms a black image on the recording material.

4. An image forming apparatus according to claim 3, wherein said light reflecting member is shifted to a position where light is reflected to said position detecting means when the position of the test pattern formed by said second image forming means is detected, and is shifted to the position where light is not reflected onto said position detecting means when the test pattern formed by said first image forming means is detected.

5. An image forming apparatus according to claim 1, wherein said position detecting means comprises a light emitting element and a light receiving element.

* * * * *